United States Patent Office 3,681,276
Patented Aug. 1, 1972

3,681,276
MIXTURE OF FATTY OIL AND POLYBUTADIENE TREATED BY ANY TWO OF THE FOLLOWING: BOILING, BODYING, REACTION WITH ACIDS OR ACID ANHYDRIDES
Masanori Nagahisa, Takatsuki-shi, Yoshimi Kusaka, Toyonaka-shi, Koji Iino, Nakagomura, and Zemichiro Yamamoto, Takada-shi, Japan, assignors to Nippon Soda Co., Ltd., Tokyo, Japan
No Drawing. Filed Oct. 8, 1969, Ser. No. 864,866
Claims priority, application Japan, Oct. 22, 1968, 43/76,501, 43/76,502; Dec. 30, 1968, 44/96,577
Int. Cl. C01d 3/28, 3/36
U.S. Cl. 260—23.7 R         10 Claims

ABSTRACT OF THE DISCLOSURE

A mixture of natural drying or semi-drying oil and polybutadiene which has a number average molecular weight of 200 to 10,000 and more than 50 percent of 1,2-configuration of the butadiene unit in its polymeric claim gives a coating material having excellent properties when treated by a boiling treatment, a bodying treatment and an addition treatment. At least two of these three treatments must be used. The boiling operation is performed by contacting the oil component with air or oxygen at a temperature between 60° C. and 150° C., the bodying operation is performed by a thermal treatment at a temperature between 100° C. and 300° C. in an inert atmosphere and the addition or esterification operation is performed by reacting with organic compounds selected from the group consisting of mono or poly carboxylic compounds, anhydride thereof and cycloaliphatic dienes in an inert atmosphere.

---

The present invention relates to the process for the preparation of a coating material and its composition, and more particularly is concerned with a process for the preparation of a coating material which is composed of drying or semi-drying oil, and polybutadiene, which are modified by a combined operations.

It is well known that a boiled fatty oil which is prepared by blowing air or oxygen into drying oil or semi-drying oil—for example, linseed oil, soya-bean oil or cotton seed oil—is widely used in a large quantity as a vehicle of varnish or paint because of its reasonable price and superior properties in workability, flexibility and weathering. However, the drying rate of the boiled oil is low and its dried film is poor in glossiness, leveling and toughness.

Besides, since synthetic drying oil such as liquid polybutadiene or copolybutadiene has more olefinic group in its molecule than the natural drying oil, the hardness of the dried film is excellent. However, drying rate at a room temperature, flexibility and weatherability of its dried film are not always satisfactory. Previously, some members of the research organization to which the inventors of the present invention belong, discovered that the modified synthetic oil, which consists of the partially oxidized polybutadiene having a main chain which is rich in 1,2-configuration of the butadiene unit, tends to accelerate the drying rate and to improve pigment wettability, adhesion and glossiness, and they submitted a patent application in Japan. Further, Japanese Pat. No. 439,784 disclosed that an oxidation reaction of polybutadiene was promoted by adding less than 35 weight percent of drying oil based on the polybutadiene and a thick coating film having the above improved properties was produced. However, these coating films have certain drawbacks, such as poor flexibility and impact resistance and are sticky, dull and streaky by brushing, and these drawbacks come from the impurities generated by a degradation of the polymer during the oxidation period.

Furthermore, Japanese patent publication No. 19,255/1967 described that grafted copolymer obtained by the thermal reaction between the polybutadiene and drying or semi-drying oil gives a coating film having sufficient flexibility and impact resistance but the drying rate and pigment wettability of the grafted copolymer are not always satisfactory and the resulting film is poor in glossiness and adhesion. From these reasons it seemed to be very difficult to produce the coating material which has good a drying rate, flexibility, glossiness, chemical resistance and hardness by an economical process.

Therefore, one of the objects of this invention is to provide a coating material containing a synthetic drying oil which has improved properties such as excellent compatibility, flexibility, impact resistance, adhesion and weathering resistance in addition to the inherent characteristics of the synthetic drying oil. Another object of the invention is to provide a coating material containing a natural drying oil which has improved properties such as excellent gloss retention, good leveling and a rapid drying rate. It is another object of the invention to provide a coating material which is suitable for aqueous emulsion paint and varnish having the aforementioned excellent properties. A further object of the invention is to provide a coating material which is suitable for use as an electro-depositing paint and varnish having the aforenamed superior properties.

We have discovered that these drawbacks which are inherent in natural drying or semi-drying oils and in synthetic drying oils can be overcome by treating them with a combined process which consist of at least two of the following, namely: boiling, bodying and addition or esterification.

More particularly, we have found that a mixture of natural drying or semi-drying oil (hereinafter called "fatty oil component") and polybutadiene which has a number average molecular weight of 200 to 10,000, and more than 50 percent of 1,2-configuration of butadiene unit in its polymeric chain (hereinafter called "polybutadiene component") give a coating material having excellent properties when the mixture is treated successively with the combined process consisting of at least two of the operations.

One of the operations which constitutes the combined process is a boiling operation in which both components are partially oxidized by air, oxygen gas or diluted oxygen gas.

The boiling operation, in general, is carried out, in the presence of an appropriate solvent and an oxidizing catalyst if desired, by blowing and bubbling air, oxygen gas or diluted oxygen gas into the oil material (hereinafter this term means either the fatty oil component or the polybutadiene component or a mixture thereof) at a range of temperature between 60° C. and 150° C., preferably 80° C. and 130° C., for 2 to 7 hrs. under agitation. The boiling operation may be performed to either the mixture of the fatty oil component and the polybutadiene component or each component individually when this operation is adopted as the first step of the combined process.

If the mixture contains at least 60 weight percent of the fatty oil component, a solvent is not always necessary for the operation but if the content of the fatty oil component is less than 50 percent, it is desirable to employ the solvent as a diluent. The solvent which may be used for the boiling operation includes aromatic hydrocarbons, e.g. benzene, toluene, xylene and ethyl benzene; aliphatic hydrocarbons, e.g. kerosene and mineral spirit; halogenated hydrocarbons, e.g. chlorobenzene, trichloroethylene and tetrachloroethylene.

Further, catalysts used for the boiling operation involve a common dryer for coating films such as heavy metal salts of naphthenic acid, rosinic acid, octenic acid and tall oil fatty acid; or organic peroxide compounds as benzoyl peroxide, di-tert-butyl peroxide, methyl ethyl ketone peroxide and cumene hydroperoxide. In the above, the heavy metals includes iron, cobalt, zinc, manganese, lead and chromium. An appropriate amount of the catalyst for the boiling operation is 0.001–1 part per hundred parts of resin (phr.) based on the metal in case of the heavy metal salts, or 0.01–2 phr. in case of an organic peroxide compound. The diluent gas used for diluting oxygen is nitrogen or inert gases.

A content of oxygen which should be introduced to the oil material in the form of chemical bond varies within the range of from 1 to 15 weight percent and according to the results of a chemical analysis and an infrared absorption spectrum analysis, it was confirmed that the oxygen was introduced in the form of carboxyl, carbonyl, hydroxyl, carboxylate, peroxide or hydroperoxide group. When the content of the oxygen is too high, the product tends to increase its viscosity and color, and degradation of molecules or gelation occurs.

On the other hand, when the content of the oxygen is too low out of the range, a drying rate and glossiness of the resulting film are not improved satisfactorily so that more than 2 percent of oxygen content is preferable.

Another operation which constitutes the combined process is a bodying operation in which the fatty oil component and the polybutadiene component are thermally polymerized by each other by an intermolecular cross-linking reaction. The bodying operation, in general, is carried out by heating the component at a range of temperature between 100° C. and 300° C., favorably 150° C. and 230° C. for 1 to 5 hrs., in the presence of a solvent and a catalyst if desired, under agitation and in an inert atmosphere. Catalysts and solvents exemplified in the boiling operation are all usable for the bodying operation. An operation period is settled according to the viscosity of the reaction mixture and the degree of reaction is confirmed by the uniformity of the reaction mixture.

The other operation which constitutes the combined process is an addition or esterification operation in which an olefinic compound makes an addition reaction on the fatty oil or polybutadiene molecule, or esterification reaction with hydroxy group of the fatty oil or the polybutadiene molecule.

The addition or esterification operation, in general, is carried out by mixing the olefinic compound or organic carboxylic compound with the fatty oil component and the polybutadiene component at a range of temperature between 80° C. and 250° C., favorably 100° C. and 230° C. for 1 to 5 hrs., in the presence of a solvent and a catalyst if desired, under agitation and in an inert atmosphere.

For this invention "olefinic compound" means $\alpha,\beta$-ethylenically unsaturated carboxylic compounds and cycloaliphatic diene compounds. The $\alpha,\beta$-ethylenically unsaturated carboxylic compounds include maleic acid, maleic anhydride, fumaric acid and chloromaleic acid, and typical cycloaliphatic diene compounds are cyclopentadiene, methyl cyclopentadiene, cyclohexadiene and dicyclopentadiene.

Organic carboxylic compounds are also applied when the fatty oil component or the polybutadiene component has a hydroxyl group, and the organic carboxylic compounds used in this case include aromatic carboxylic acids, e.g. benzoic acid, p-oxybenzoic acid, phthalic acid, phthalic anhydride, isophthalic acid and terephthalic acid; cycloaliphatic carboxylic acids, e.g. terahydro phthalic anhydride and hexachlorophthalic anhydride; aliphatic carboxylic acids, e.g. adipic acid, sebacic acid, lauric acid and stearic acid but exclude low molecular carboxylic acids such as acetic acid and propionic acid.

A quantity of olefinic compound employed for the operation is from 0.1 to 30 weight percent and favorably from 1 to 20 weight percent based on the total quantity of the fatty oil component and the polybutadiene component and is settled so as to fit the usage of the resulting product. For example, when the product is to be used as a coating material of solvent type paint or varnish, a relatively small amount of the olefinic compound is suitable and when the product is to be used as a coating material of water paint or varnish, a relatively large amount is preferable. The unreacted olefinic compound in the reaction product may be removed by applying vacuum distillation or rinsing with water.

In order to prevent gelling of the reaction product which is often observed in reactions at a relatively high temperature, from 0.01 to 2 weight percent, based on weight of the oil material, of an antioxidant such as 2,6-di-tert-butyl-p-cresol or 6-phenyl-2,2,4-trimethyl-1,2-dihydroquinoline may be used as a gelling inhibitor.

The catalyst which is used for promoting the reaction includes ortho-phosphoric acid, para-toluene sulfonic acid, calcium hydroxide, calcium naphthenate, zinc oxide, calcium oxide, sulfur dioxide, ammonium iodide, iodoform, phosphorus iodide and aluminium iodide, and its amount is selected in the range of 0.01 to 5 weight percent and preferably 0.1 to 2 weight percent.

When the oil material contains hydroxyl group, esterification reaction takes place together with the addition reaction simultaneously. Hereupon, the $\alpha,\beta$-ethylenically unsaturated carboxylic compound mainly seems to proceed for an addition reaction on the $\alpha$-position of olefinic or vinyl group of the oil material, and a part of which seems to esterify the hydroxyl group of the oil material.

In contrast with this, the organic carboxylic compounds containing no $\alpha,\beta$-ethylenically unsaturated group cause only the esterification reaction and the cycloaliphatic diene compounds show only an addition reaction. The addition reaction is certified by characteristic absorption peaks of an infrared absorption spectrum at, for example, about 1,870 cm.$^{-1}$, 1,790 cm.$^{-1}$, 1,220 cm.$^{-1}$ and 1,070 cm.$^{-1}$ and characteristic signals of a nuclear magnetic resonance spectrum at, for example, about 6.95, 7.25 and 7.4$\tau$.

Combinations and an order of the operations are optional but the most preferable combination consists of all three operations where the addition operation is conducted at the second or the last step. Each operation may be performed individually but in some case may be performed successively and continuously.

Polybutadiene used for the present invention is produced by the conventional processes using such catalyst system as an alkali metal catalyst in a Lewis base solvent, an alkali metal catalyst in a non-polar hydrocarbon solvent, alkyl, aryl or alkyl lithium catalyst in a non-polar hydrocarbon solvent and a coordinated anionic catalyst. The alkali metal aforenamed is lithium, sodium, potassium, rubidium or cesium; the alkyl, aryl or aralkyl lithium catalyst is, for example, ethyl, propyl, butyl, amyl, phenyl or cumyl lithium; and typical examples of the coordinated anionic catalysts are triethylaluminium-triacetylaceto vanadium, triethylaluminium-triacetylaceto chromium and triethyl aluminium-tetrabutyl titanium. However, the polybutadiene employed for the present invention is required, as mentioned previously, to have a number average molecular weight within a range between 200 and 10,000, and to have at least 50 percent of 1,2-configuration content.

In general, 1,3-butadiene can enter into a polymer chain by either 1,2- or 1,4-mode of addition. The 1,2-mode of addition (so-called 1,2-configuration) results in the following "pendant vinyl" structure

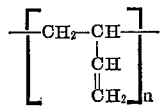

whereas 1,4-mode of addition (so-called 1,4-configuration) results in the following structure

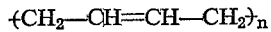

The mode of addition depends on the type of catalyst and conditions used for the polymerization.

If the polybutadiene is rich in 1,4-configuration, it tends to gel during the boiling operation and the resulting product is poor in pigment wettability and has increased stickiness. Particularly favorable polybutadiene is, for instance, produced as follows: Butadiene or a mixture of butadiene and diluent is introduced into the Lewis base containing a dispersed alkali metal such as lithium, sodium, potassium, rubidium or cesium and an aromatic hydrocarbon activator such as naphthalene or 1,2-diphenylbenzene and then polymerized under chilling of below —30° C. and agitation. By mixing the resulting reaction mixture with a proton-donor reagent such as water, alcohols or carboxylic acids, butadiene homopolymer is obtained. When butadiene and any of comonomer are added simultaneously, alternatively or successively into the said Lewis base and the resulting reaction mixture is treated with the proton-donor reagent, copolymer is prepared. This polymerization reaction can also be carried out in the absence of the aromatic hydrocarbon activator when the dispersed alkali metal is such enough fine as the average diameter of the particle is less than $5\mu$. When the reaction mixture is treated with an electrophilic agent such as carbon dioxide, alkylene oxide having less than 5 carbon atoms or ethylene sulfide proceeding to the addition of the proton-donor reagent, polybutadiene having functional groups is obtained. The aromatic hydrocarbon activator used for this reaction is condensed ring aromatic hydrocarbons such as anthracene, naphthalene and phenanthrene: non-condensed ring aromatic hydrocarbons such as biphenyls and terphenyls: polynucler condensed ring aromatic compounds such as binaphthyls and phenyl naphthalenes: conjugated unsaturated hetero cyclic compounds substituted with a vinyl group such as α-vinyl pyridine and vinyl furan: and diaryl ketones such as benzophenone and phenyl naphthyl ketone. The Lewis base used for this reaction is ethers such as dimethyl ether, methyl ethyl ether, 1,2-dimethoxy ethane, 2,2′-dimethoxy dimethyl ether, tetrahydrofuran and 1,4-dioxane; acetals such as methylal and 1,1-dimethoxy ethane; and tertiary amines such as trimethyl amine, triethylamine and N-methyl morpholine. Thus, the polybutadiene obtained by the above process has more than 80 percent of 1,2-configuration and extremely narrow distribution of the molecular weight, and consequently it is particularly favorable for the present invention.

The comonomer which can be used for the copolybutadiene includes isoprene, styrene, α-methyl styrene, acrylonitrile, alkyl acrylates and alkyl methacrylates.

The fatty oil component of the present invention consists of natural drying or semi-drying oil and modified oil thereof and the typical examples of them are linseed oil, safflower oil, peanut oil, dehydrated castor oil, soyabean oil, rape seed oil, cotton seed oil, corn oil, paulownia oil, cod liver oil, cuttlefish oil and whale oil.

The ratio of the polybutadiene component to the fatty oil component in the present invention is in the range between 95:5 and 5:95 in weight and the range between 80:20 and 10:90 is particularly important in an industrial view point. Then, a mixture having a high content of the polybutadiene component gives the synthetic coating material having improved properties such as good flexibility, high impact resistance, weatherability and non-stickiness, in addition to such inherent fortes of the polybutadiene of 1,2-configuration, as good compatibility, high drying rate, good chemical resistance and hardness. A mixture containing a high content of the fatty oil component gives the improved fatty coating material having excellent properties such as superior gloss retention, high drying rate and good leveling. A mixture consisting of nearly equal amount of the both components gives a coating material having combined merits.

The object of this invention can be attained by performing at least two operations and, when we perform only one operation, even if the ratio of the fatty oil component to the polybutadiene component is suitable, properties of the resulting coating material are unsatisfactory. For example, coating material which is produced only by the boiling operation is poor in drying rate and leveling and its film has stickiness and wrinkles; the coating material produced only by the bodying operation is poor in pigment wettability and drying rate and its coating film has stickiness and is poor in glossiness; and the coating material produced only by the addition or esterification operation is poor in drying rate and the coating film is lusterless.

The coating material of the present invention has superior properties as a vehicle for paint, varnish or enamel aforementioned, and an air drying paint, a bake-drying paint, an aqueous emulsion paint and an electro-depositing aqueous paint are prepared respectively as follows:

An air drying paint or varnish of the present invention is obtained by mixing the coating material with a solvent homogeneously, adding a dryer, a pigment, other auxiliaries and other kinds of resins if necessary, with an appropriate apparatus for mixing, e.g. a three-rollmill. The dryer is selected from common dryers used to promote a drying rate of film and typical examples are heavy metal salts of acetanic, naphthenic, rosin and tall oil fatty acid. The heavy metals include cobalt, manganese, lead, iron, zinc, zirconium, calcium and rare earth metals. Among these heavy metal salts, a combination of lead salt and manganese or cobalt salt is particularly preferable and are employed in a quantity corresponding to 0.001 to 1 weight percent of heavy metal.

Typical solvents are aromatic hydrocarbons, e.g. toluene, xylene, ethyl benzene and Solvesso; aliphatic hydrocarbons e.g. kerosene and mineral spirit; alcohols, e.g. butylalcohol, isopropyl alcohol and methyl ethyl carbinol; esters, e.g. ethyl acetate and butyl acetate; ketones e.g. methyl ethyl ketone, methyl butyl ketone and cyclohexanone; halogenated hydrocarbons e.g. carbon tetrachloride, trichloroethylene and tetrachloroethylene; ethers e.g. ethylene glycol monoethyl ether, ethylene glycol diethyl ether, ethylene glycol monobutyl ether and dioxane; and mixtures thereof.

Additionally, an antiskinning agent such as phenols or oximes for example, methoxy phenol, di-tert-butylhydroxy toluene, methyl ethyl ketoxime and butyl dioxime, plasticizers such as alkyl phthalate, alkyl adipate, chlorinated polyolefin and halogenated paraffin, thickener such as metallic soaps, cellulose ethers and polyoxyalkylene ethers, anti-mold agent such as organic tins and organic mercurys, ultraviolet absorbent, antistatic agent and dispersing agent are employed as the auxiliaries.

The pigment used for this paint composition includes inorganic pigment e.g. titanium dioxide, zinc oxide, white lead, red lead, chrome yellow, ultramarine, iron blue, red iron oxide, cobalt oxide, chromium oxide and carbon black and organic pigments e.g. nitroso-, nitro- or azo-pigments, lake pigments and phthalocyane pigments.

A bake-drying paint or varnish of the present invention obtained by a similar procedure and composition as the air drying paint or varnish, and organic peroxide which involves benzoyl peroxide, tert-butyl perbenzoate, di-tert-butyl peroxide, dicumyl peroxide, methyl ethyl ketone peroxide, tert-butyl hydroperoxide, cumene hydroperoxide, and perlauric acid is also available as the dryer. Further, thermal stability of the pigment should be taken into account.

Water-soluble and/or water-dispersible paint or varnish is prepared from the coating material having an acid value within the range between 30 and 120, where the coating material is substantially obtained by the addition operation of $\alpha,\beta$-ethylenically unsaturated dicarboxylic compound or the esterification operation of the hydroxyl group of the oil material with an organic polycarboxylic acid. The acid value is variable by adjusting the degree of the addition or esterification of the oil material, or by esterifying or ammonolyzing the product of the addition operation.

The coating material is dissolved in a hydrophilic solvent, neutralized to an adequate degree of neutralization with respect to its usage, mixed with water and auxiliaries required, and then the aqueous paint or varnish is prepared. The hydrophilic solvent in the above involves alcohols, e.g. methanol, ethanol, propanol and butanol; glycol ethers e.g. ethylene glycol methyl ethers, ethylene gyco ethyl ethers and ethylene glycol butyl ethers; cyclic ethers, e.g. tetrahydrofuran and 1,4-dioxane; and ketones e.g. methyl ethyl ketone and acetone. The neutralizing agent used for the aqueous paint or varnish involves inorganic alkali e.g. caustic soda, caustic potash, aqueous ammonia; alkyl monoamines e.g. alkyl amines, dialkyl amines and trialkyl amines; polyamines e.g. ethylene diamine, diethylene triamine, morpholine and N-alkyl morpholines; and alkanol amines e.g. mono ethanol amine, diethanol amine, dipropanol amine, triethanol amine and dimethyl amino ethanol. The pigment and other auxiliaries exemplified in the air or baking drying paint are available in this composition.

For the purpose of giving those skilled in the art a better understanding of the invention, the following illustrative examples are given, and it is to be observed that all quantities described in this specification and the appended claims as "parts" or "percent" refer to "parts by weight" or "percent by weight" unless expressly stated otherwise.

EXAMPLE 1

Butadiene was added into tetrahydrofuran containing a dispersed metallic sodium and 1,2-diphenyl benzene as an activator at $-75°$ C. and was polymerized under vigorous agitation. The reaction mixture was treated with water, separated from water layer and tetrahydrofuran was distilled off from the mixture. Thus, polybutadiene (A) having a number average molecular weight of 2,520, 92.0% of 1,2-configuration of butadiene unit in the polymeric chain and 8.0% of trans-1,4-configuration was obtained.

20 parts of the polybutadiene (A) was mixed with 80 parts of the purified linseed oil having an iodine value of 181 and an acid value of 0.2 and the resulting mixture was partially oxidized by blowing and bubbling air into it (boiling operation) together with 0.03 part of manganese in the form of naphthenate, at 95° C. for 4 hrs. Thus, 7.3% of oxygen was introduced in the form of chemical bond. After finishing the boiling operation, 1 part of di-tert-butyl peroxide was added to the reaction mixture as a catalyst, and the mixture was thermally and partially polymerized by heating at 230° C. for 3 hrs. (boiling operation) under a nitrogen atmosphere and then the coating material having an average molecular weight of 1,648, $Z_3$–$Z_4$ of a bubble viscosity at 20° C. and 1.5 of an acid value was prepared. 80 parts of this coating material was diluted with 20 parts of mineral spirit, mixed with 0.056 part of cobalt and 0.56 part of lead in the form of naphthenate, and thus clear varnish (I) was obtained.

According to the results of tests described in Example 19, it is found that the clear varnish (I) and its coating film have excellent properties as shown in Table 1.

EXAMPLE 2

Polybutadiene (B) having a number average molecular weight of 3,070, 91% of 1,2-configuration, 9% of trans-1,4-configuration was produced by the similar process as described in Example 1. 70 parts of the polybutadiene (B), 30 parts of the purified linseed oil and 100 parts of xylene were mixed together, 1.5 parts of cumene hydroperoxide based on the ingredient was added and air was blown and bubbled into this mixture at 130° C. for 3 hrs. under vigorous agitation. Thus, 8.2% of oxygen was introduced in the form of chemical bond.

After finishing the boiling operation and replacing the atmosphere by nitrogen, and distilling off 60 parts of xylene, the bodying operation was carried out by heating the mixture at 150° C. for 2 hrs. and then the coating material having $Z_1$ of a bubble viscosity and 1.8 of an acid value was prepared.

100 parts of this coating material including 30 parts of xylene was mixed with 0.035 part of cobalt and 0.35 part of lead in the form of naphthenate, and thus clear varnish (II) was obtained.

Further, 47 parts of titanium dioxide was added to the clear varnish (II) followed by dispersing by means of a three-roll mill and diluting with xylene, and thus white enamel paint (III) was obtained.

According to the results of tests, it is found that the clear varnish (II), the white enamel paint (III) and their coating films have excellent properties as shown in Tables 1 and 2.

EXAMPLE 3

45 parts of the polybutadiene (B) and 0.6 part of cumene hydroperoxide based on the ingredient were dissolved into 55 parts of xylene and air was blown into the resulting solution and bubbled at 130° C. for 3 hrs. under vigorous agitation. Thus, 8.9% of oxygen was introduced in the form of chemical bond.

On the other hand, 100 parts of the same purified linseed oil as in Example 1 was mixed with 0.02 part of manganese in the form of naphthenate and the mixture was boiled at 95° C. for 4 hrs. by the similar operation as done in the case of the polybutadiene.

100 parts of the boiled polybutadiene including 55 parts of xylene, 30 parts of the boiled linseed oil (L') and 0.5 part of cumene hydroperoxide based on the ingredient were mixed and after distilling off 15 parts of xylene, the bodying operation was carried out by heating the boiled mixture at 130° C. for 4 hrs. in a nitrogen atmosphere under vigorous agitation and then the coating material having $Z_2$–$Z_3$ of a bubble viscosity was prepared.

100 parts of this coating material was mixed with 0.035 part of cobalt and 0.35 part of lead in the form of naphthenate, and thus clear varnish (IV) was obtained.

According to the results of tests described in Examples 19 and 20, it is found that the clear varnish (IV) and its coating film have excellent properties as shown in Tables 1 and 2.

EXAMPLE 4

Polybutadiene (C) having a number average molecular weight of 4931, 92% of 1,2-configuration, and 8% of trans-1,4-configuration was produced by the similar process as described in Example 1. 20 parts of polybutadiene (C), 56 parts of the purified linseed oil, 24 parts of the purified soya-bean oil having 135 of an iodine value and 0.3 of an acid value were mixed together, 0.01 part of manganese in the form of naphthenate was added and air was blown into the resulting mixture and bubbled at 95° C. for 6 hrs. under agitation. Thus, 9.1% of oxygen was introduced in the form of chemical bond.

After finishing the boiling operation and replacing the atmosphere by nitrogen, the bodying operation was carried out by heating the boiled mixture with 0.3 part of di-tert-butyl peroxide at 150° C. for 2 hrs. Successively, the reaction product was allowed to react with 3 parts of maleic anhydride at 150° C. for 2 hrs. in a nitrogen atmosphere and then the coating material having $Z_6$ of a bubble viscosity and 12 of an acid value was prepared.

80 parts of this coating material was diluted with 20 parts of mineral spirit and mixed with 0.056 part of cobalt and 0.56 part of lead in the form of naphthenate as the dryer, and thus clear varnish (V) was obtained.

Furthermore, 100 parts of clear varnish (V) was mixed with 130 parts of titanium dioxide, dispersed by the same way as described in Example 2 and then adjusted viscosity by adding mineral spirit so as to be 74 of a Krebs-Clnit (KU), thus the white enamel paint (VI) was obtained.

According to the results of tests described in Example 19, the clear varnish (V), the white enamel paint (VI) and their coating films have excellent properties as shown in Table 1.

EXAMPLE 5

A mixture of butadiene and styrene was added into tetrahydrofuran containing a dispersed metallic sodium and naphthalene as an activator at −80° C. and was polymerized under vigorous agitation. The reaction mixture was treated with water, separated from water layer and tetrahydrofuran was distilled off from the mixture. Thus, butadiene copolymer (D) having 80% of butadiene unit, 20% of styrene unit, a number average molecular weight of 2,550, 85% of 1,2-configuration, 13% of trans-1,4-configuration and 2% of cis-1,4-configuration was obtained.

20 parts of butadiene copolymer (D), 6 parts of cumene hydroperoxide and 80 parts of the purified mixed oil composed of 56 parts of the linseed oil and 24 parts of the soya-bean oil were mixed together, and air was blown into the resulting mixture and bubbled at 130° C. for 3 hrs. under agitation. Thus, 6.7% of oxygen was introduced in the form of chemical bond.

After finishing the boiling operation and replacing the atmosphere by nitrogen, the bodying operation was carried out by heating the boiled mixture at 200° C. for 1.5 hrs. Further, the reaction product was allowed to react with 3 parts of maleic anhydride at 200° C. for 1.5 hrs. in the nitrogen atmosphere successively, and then the coating material having $Z_2$ of a bubble viscosity and 11 of an acid value was prepared.

80 parts of this coating material was mixed with 20 parts of xylene, 0.056 part of cobalt and 0.56 part of lead in the form of naphthenate, thus clear varnish (VII) was obtained.

According to the results of tests described in Example 19, it is found that the clear varnish (VII) and its coating film have excellent properties as shown in Table 1.

EXAMPLE 6

Butadiene was added into tetrahydrofuran containing a dispersed metallic sodium and 1,2-diphenyl benzene as an activator at −80° C. and was polymerized under vigorous agitation. The reaction mixture was treated with ethylene oxide followed by treatment with water, separated from water layer and tetrahydrofuran was distilled off from the mixture. Thus, polybutadienediol (E) having a number average molecular weight of 1,311, 52 of a hydroxyl value, 91% of 1,2-configuration, 9% of trans-1,4-configuration and 1.1 of a molecular weight distribution parameter which was calculated from the ratio of a weight average molecular weight was obtained.

60 parts of polybutadienediol (E), 40 parts of the same soya-bean oil as in Example 4 and 100 parts of xylene were mixed together to be a homogeneous solution, and 1.5 parts of cumene hydroperoxide based on the ingredient was added to the solution and air was blown into the resulting mixture and bubbled at 130° C. for 3 hrs. under agitation. Thus, 7.1% of oxygen was introduced in the form of chemical bond through this operation.

After finishing the boiling operation and replacing the atmosphere by nitrogen, 60 parts of xylene was removed from the mixture and the bodying operation was carried out by heating the boiled mixture at 150° C. for 1.5 hrs. under vigorous agitation. The reaction product was divided into two portions and to one portion of the reaction product, 9%, based on the solid matter, of maleic anhydride was added and the mixture was allowed to react at 110° C. to 120° C. for 1.5 hrs. in a nitrogen atmosphere (addition operation). After completion of the addition operation, xylene in the reaction mixture was completely removed under the reduced pressure and then the coating material having a number average molecular weight of 2,590 and 54 of an acid value was obtained.

100 parts of this coating material was diluted with 30 parts of ethylene glycol butyl ether, partially neutralized by 0.7 equivalent quantity, based on the carboxyl equivalent, of triethyl amine, and diluted with water gradually, and thus a slightly turbid water varnish (VIII) was obtained. This water varnish contains 50% of a solid matter, has $Z_4$ to $Z_5$ of a bubble viscosity and 7.1 of pH, and is useful for a dip, a brush and an electrodeposition coating.

To the other portion of the reaction product, 14 percent, based on the solid matter, of tetra hydro phthalic anhydride was added and the mixture was allowed to react at 110° C. to 120° C. for 1.5 hrs. in a nitrogen atmosphere (esterification operation). After completion of the reaction, xylene in a mixture was completely removed under the reduced pressure and then the coating material having a number average molecular weight of 2,627, and 54.5 of an acid value was obtained. A clear water varnish (IX) having Y to Z of a bubble viscosity and 7.8 of pH was obtained from this coating material by the similar procedure as in case of the water varnish (VIII).

According to the results of tests described in Examples 21 and 22, it is found that the varnish (VIII), (IX) and their coating films have excellent properties which is shown in Tables 3 and 4.

EXAMPLE 7

To 72 parts of the boiled linseed oil (L′) which was produced in Example 3, 1.5 parts of maleic anhydride was added and the resulting mixture was allowed to react at 200° C. for 1.5 hrs. in a nitrogen atmosphere.

60 parts of this modified linseed oil, 40 parts of the boiled polybutadiene which was produced in Example 3 and 0.45 part of cumene hydroperoxide were mixed together and the bodying operation was caried out by heating at 200° C. for 2 hrs., removing the xylene from the mixture.

After finishing the reaction, xylene was completely removed by applying vacuum distillation, and then the coating material having $Z_4$ to $Z_5$ of a bubble viscosity and 4 of an acid value was obtained.

80 parts of this coating material was dliuted with 20 parts of mineral spirit and mixed with 0.056 part of cobalt and 0.56 part of lead in the form of naphthenate, and thus clear varnish (X) was obtained.

According to the results of tests described in Example 19, it is found that the clear varnish (X) and its coating film have excellent properties as shown in Table 1.

EXAMPLE 8

20 parts of polybutadiene (A) in Example 1 and 80 parts of the purified linseed oil were mixed together, and 0.03 part of manganese in the form of naphthenate was added to the mixture and air was blown into the resulting mixture and bubbled at 95° C. for 4 hrs. under agitation. Thus, 7.4% of oxygen was introduced in the form of chemical bond.

After finishing the boiling operation and replacing the atmosphere with nitrogen gas, the reaction was carried out by heating the boiled mixture with 3 parts of maleic anhydride at 200° C. for 1.5 hrs. and then the coating material having $Z_3$ to $Z_4$ of a bubble viscosity and 12 of an acid value was prepared.

80 parts of this coating material was diluted with 20 parts of mineral spirit and mixed with 0.056 part of cobalt and 0.56 part of lead in the form of naphthenate, and thus clear varnish (XI) was obtained.

According to the results of tests described in Example 20, it is found that the clear varnish (XI) and its coating film have excellent properties as shown in Table 2.

EXAMPLE 9

60 parts of polybutadiene (B) in Example 2, 40 parts of the purified linseed oil and 100 parts of xylene were mixed together and 1.5 parts of cumene hydroperoxide based on the ingredient was added and air was blown into the resulting mixture and bubbled at 130° C. for 3 hrs. under agitation. Thus, 7.2% of oxygen was introduced in the form of chemical bond.

After finishing the boiling operation, removing 60 parts of xylene under reduced pressure and replacing the atmosphere with nitrogen, the addition operation was carried out by heating the boiled mixture with 2 parts of maleic anhydride at 130° C. for 2 hrs. and then the coating material having Y to Z of a bubble viscosity and 9 of an acid value was prepared.

100 parts of this coating material (containing 70% of a solid matter) was mixed with 0.035 part of cobalt and 0.35 part of lead in the form of naphthenate, and thus clear varnish (XII) was obtained. Further, 47 parts of titanium dioxide was added to the clear varnish (XII) followed by dispersing by means of three-roll mill and diluting with an adequate quantity of xylene, and thus white enamel paint (XIII) was obtained.

According to the results of tests described in Example 19 and 20 it is confirmed that the clear varnish (XII), the white enamel paint (XIII) and their coating films have excellent properties as shown in Tables 1 and 2.

EXAMPLE 10

60 parts of polybutadiene diol (E) in Example 6, 40 parts of the purified soya-bean oil and 100 parts of xylene were mixed together, and 1.5 parts of cumene hydroperoxide based on the ingredient was added and oxygen diluted with nitrogen was blown into the resulting mixture and bubbled at 130° C. for 3 hrs. under agitation. Thus, 7.8% of oxygen was introduced in the form of chemical bond.

After finishing the boiling operation, removing 60 parts of xylene and replacing the atmosphere with nitrogen gas, the esterification was carried out by heating the boiled mixture with 14% of tetrahydrophthalic anhydride based on the solid matter at 120° C. for 2 hrs. and then the coating material having an average molecular weight of 1,650 and 55 of an acid value was prepared. Xylene in the reaction mixture was completely removed and a clear water soluble varnish having W of a bubble viscosity and 7.7 of pH (XIV) was obtained by diluting the 100 parts of the coating material with 30 parts of ethylene glycol butyl ether, neutralizing with 0.7 equivalent of triethyl amine based on the carboxyl equivalent of the coating material and adding water gradually until 50% of a solid content was obtained.

According to the results of tests described in Examples 21 and 22, it is found that the clear aqueous varnish (XIV) and its coating film have excellent properties as shown in Tables 3 and 4.

EXAMPLE 11

45 parts of the butadiene copolymer (D) in Example 5 was boiled with 0.6 part of cumene hydroperoxide as catalyst by blowing air at 130° C. for 3.5 hrs. under agitation. Thus, 8.3% of oxygen was introduced in the form of chemical bond.

100 parts of this boiled butadiene copolymer (D') which contains 55 parts of xylene, 30 parts of the boiled linseed oil (L') which was produced in Example 3, and 2 parts of maleic anhydride was mixed and allowed to react at 150° C. for 1.5 hrs. in a nitrogen atmosphere under agitation and then the coating material having $Z_3$ to $Z_4$ of a bubble viscosity and 9 of an acid value was prepared.

100 parts of this coating material including 30% of xylene was mixed with 0.035 part of manganese and 0.35 part of lead in the form of naphthenate and thus clear varnish (XV) was obtained.

According to the results of tests described in Example 19, it is found that the clear varnish (XV) and its coating film have excellent properties as shown in Table 1.

EXAMPLE 12

20 parts of polybutadiene (C), 56 parts of the purified linseed oil and 24 parts of the purified soya-bean oil were mixed together, 1 part of cumene hydroperoxide based on the ingredient was added as catalyst and air was blown into the resulting mixture and bubbled at 130° C. for 3 hrs. under agitation. Thus, 8.0% of oxygen was introduced in the form of chemical bond. To 100 parts of the boiled mixture, 3 parts of maleic anhydride was added and allowed to react at 200° C. for 1 hr., and additionally heated at the same temperature for 1.5 hrs. in a nitrogen atmosphere, and the coating material having $Z_6$ of a bubble viscosity and 11 of an acid value was prepared.

80 parts of this coating material was diluted with 20 parts of mineral spirit and mixed with 0.056 part of cobalt and 0.56 part of lead in the form of naphthenate and thus clear varnish (XVI) was obtained.

100 parts of the clear varnish was mixed with 130 parts of titanium dioxide, dispersed by a three-roll mill and adjusted the viscosity by adding mineral spirit until it reached to 74 of a KU and thus the white enamel paint (XVII) was obtained.

According to the results of tests described in Example 19, the clear varnish (XVI), the white enamel paint (XVII) and their coating films have excellent properties as shown in Table 1.

EXAMPLE 13

The boiled linseed oil (L') prepared in Example 3 was partially polymerized by heating at 250° C. for 3 hrs. in a nitrogen atmosphere. 63 parts of the reaction product, 60 parts of the boiled polybutadiene (D') in Example 11 and 2.5 parts of maleic anhydride were mixed and allowed to react at 150° C. for 1.5 hrs. with driving out xylene. After stopping the reaction, remaining xylene in the reaction mixture was completely removed and thus coating material having $Z_4$ of a bubble viscosity and 11 of an acid value was obtained.

80 parts of the coating material was diluted with 20 parts of mineral spirit and treated by similar procedure as described in Example 12, and thus clear varnish (XVIII) was obtained.

According to the results of tests described in Example 19, it is found that the clear varnish (XVIII) and its coating film have excellent properties as shown in Table 1.

EXAMPLE 14

20 parts of polybutadiene (B) in Example 2, 56 parts of the purified linseed oil, 24 parts of the purified soya-bean oil and 1 part of cumene hydroperoxide were mixed together, and the mixture was heated at 235° C. for 2.5 hrs. in a nitrogen atmosphere under agitation.

After finishing the heating, the reaction product was allowed to cool to 130° C. and mixed with 0.01 part of manganese in the form of naphthenate and air was blown and bubbled into the reaction mixture maintaining the above temperature for 3 hrs. Then, the coating material having a number average molecular weight of 1,350, Z of a bubble viscosity, 5.6% of oxygen content and 1.9 of an acid value was prepared.

80 parts of this coating material was diluted with 20 parts of mineral spirit and mixed with 0.056 part of cobalt and 0.56 part of lead in the form of naphthenate and thus clear varnish (XIX) was obtained.

100 parts of the clear varnish (XIX) was mixed with 120 parts of titanium dioxide, dispersed by a three-roll mill and adjusted the viscosity by adding mineral spirit, and thus white enamel paint (XX) was obtained.

According to the results of tests described in Example 19, it is found that the clear varnish (XIX), the white enamel paint (XX) and their coating films have excellent properties as shown in Table 1.

EXAMPLE 15

60 parts of polybutadiene (B), 28 parts of the purified linseed oil, 12 parts of the purified soya-bean oil and 30 parts of xylene were mixed together, and 1 part of di-tert-butyl peroxide was added, and the resulting mixture was allowed to thermally polymerize at 150° C. for 3 hrs. and partially oxidized at 120° C. for 1.5 hrs. successively by the similar operation as described in Example 14. Then, the coating material having more than $Z_6$ of a bubble viscosity, 6.9% of oxygen content and 2 of an acid value was prepared.

Further, the clear varnish (XXI) was obtained by the similar composition shown in Example 14.

According to the results of tests described in Example 20, it is found that the clear varnish (XXI) and its coating film have excellent properties as shown in Table 2.

EXAMPLE 16

20 parts of butadiene copolymer (D) in Example 5, 56 parts of the purified linseed oil and 24 parts of the purified soya-bean oil were mixed together, and the mixture was allowed to thermally polymerize and partially oxidize under the similar conditions as in Example 14. Thus, 6.4% of oxygen was introduced in the form of chemical bond. Further, the reaction mixture was mixed with 3 parts of maleic anhydride, heated at 130° C. for 2 hrs. in a nitrogen atmosphere, and then the coating material having a number average molecular weight of 1,540, $Z_3$ to $Z_4$ of a bubble viscosity and 15 of an acid value was prepared. Furthermore, the clear varnish (XXII) and the white enamel paint (XXIII) were obtained by the similar compositions as shown in Example 14.

According to the results of tests described in Examples 19 and 20, it is found that the clear varnish (XXII), the white enamel paint (XXIII) and their coating films have excellent properties as shown in Tables 1 and 2.

EXAMPLE 17

Polybutadienediol (F) having a number average molecular weight of 1,450, 64 of a hydroxyl value, 1.15 of the molecular weight distribution parameter described in Example 6, 92% of 1,2-configuration and 8% of 1,4-trans-configuration was manufactured by the similar process as described in Example 6.

60 parts of the polybutadienediol (F), 40 parts of the purified linseed oil and 30 parts of xylene were mixed together, and 1 part of cumene hydroperoxide based on the ingredient was added and the mixture was allowed to thermally polymerize and partially oxidized under the similar conditions described in Example 15. The resulting product having a number average molecular weight of 1,360, 49 of a hydroxyl value and 1.7 of an acid value was partially esterified by reacting with tetra-hydrophthalic anhydride which quantity was 85% based on the enough quantity to make half ester. After keeping the temperature at 120° C. for 1.5 hrs., the coating material having 40 of an acid value was prepared. Further, the clear water soluble varnish (XXIV) having Z of a bubble viscosity and 7.9 of pH was obtained by treating the coating material with the similar procedure described in Example 10.

According to the results of tests described in Example 21 and 22, it is found that the clear varnish (XXIV) and its coating film have excellent properties as shown in Tables 3 and 4.

EXAMPLE 18

For the purpose of the comparison, the following paints or varnishes were prepared.

(Con-1) 100 parts of the commercial boiled linseed oil having a number average molecular weight of 1,200, 58% of oxygen content, 170 of an iodine value, 2.5 of an acid value was mixed with 0.02 part of manganese and 0.3 part of lead in the form of naphthenate and then a clear varnish (Con-1) was prepared.

(Con-2) 31 parts of the above commercial boiled linseed oil, 59 parts of zinc oxide and 10 parts of mineral spirit are dispersed by a three roll mill and 0.03 part of manganese and 0.3 part of lead in the form of naphthennate are added to the mixture, and thus the white paint (Con-2) was prepared.

(Con-3) 45 parts of polybutadiene being prepared by the similar procedure as described in Example 1 and having a number average molecular weight of 3,200, 91% of 1,2-configuration and 9% of trans-1,4-configuration was dissolved in 55 parts of xylene and air was blown and bubbled into the resulting solution at 130° C. in the presence of 0.07 part of cumene hydroperoxide as catalyst until the oxygen content reached to 7%. A clear varnish (Con-3) was obtained by adding 0.02 part of manganese and 0.3 part of lead in the form of naphthenate to the above boiled polybutadiene. (Con-4) 70 parts of Buton 100 (butadiene styrene copolymer having a number average molecular weight of 2,500, 70% of 1,2-configuration, 20% of trans-1,4-configuration, 10% of cis-1,4-configuration and 80% of butadiene unit, available from Esso Standard Co.) was mixed with 30 parts of the linseed oil and partially oxidized according to the process disclosed in Japanese Pat. No. 439,784 and a varnish (Con-4) was obtained by adding 0.02 part of manganese and 9.3 parts of lead in the form of naphthenate.

(Con-5) 20 parts of Buton 100, 80 parts of the purified linseed oil and 1 part of di-tert-butyl peroxide are mixed together and the mixture was thermally polymerized at 230° C. for 3 hrs.

A clear varnish (Con-5) was obtained by the similar composition as described in Example 1.

EXAMPLE 19

Cleaned steel testing plates were coated by a brush with the clear varnishes or paints which were provided in the said examples from 1 to 5, 7 to 9, 11 to 16 and 18 respectively, and a thickness of every coating film was settled in the range from 20 to 30μ. The coating films were air dried and tested. Testing results are presented in Table 1.

Testing method (1) Pigment wettability.—Judged from the amount of 50% varnish required to form a paste with 2 g of titanium dioxide by spatula rub-out.

(2) Workability.—Judged from the brushability of applying the coating material on a steel test panel with a wide painting brush.

(3) Drying property.—ASTM D–1640–59.

(4) Stickness.—ASTM D–1640–59.

(5) Appearance of film.—Visual observation of film with respect to leveling, glossy, wrinkles and crack.

(6) Gloss.—ASTM D–523–62T.

(7) Pencil hardness.—A set of pencils ranging from 6B soft to 6H hard was started with the hard end of the set. They were pushed in turn into the film. The softest pencil which crumbled instead of penetrating was indicated as the pencil hardness.

(8) Sward Rocker hardness.—ASTM D–2134–62T.

(9) Crosscut adhesion.—Number of frames not removed by pressing on and removing Scotch tape, to 100 frames made of crosscut of 1 mm. space.

(10) Flexibility.—ASTM D–1737–62.

(11) Du Pont impact.—Measurement was carried by Parlin Du Pont impact tester under conditions of ½"×500 g. The data was given on a height (cm.) in which pass the test.

(12) Alkali resistance.—5% of aqueous caustic soda, dip for 2 days.

Tests (7), (8), (9), (10) and (11) were performed after 10 days since coating.

Standard of estimation; Excellent—Good—Fair—Poor.

TABLE 1

| Example | Poly-buta-diene | Fatty oil/poly-butadiene | Coating material | Form (*1) | Pigment wetta-bility | Worka-bility |
|---|---|---|---|---|---|---|
| 1 | (A) | 8/2 | I | CV | ○ | ◉ |
| 2 | (B) | 3/7 | II / III | CV / E | ◉ | ○ |
| 3 | (B) | 4/6 | IV | CV | ◉ | ◉ |
| 4 | (C) | 8/2 | V / VI | CV / E | ◉ | ◉ |
| 5 | (D) | 8/2 | VII | CV | ◉ | ◉ |
| 7 | (B) | 8/2 | X | CV | ○ | ◉ |
| 8 | (A) | 8/2 | XI | CV | ◉ | ◉ |
| 9 | (B) | 4/6 | XII / XIII | CV / E | ◉ | ○ |
| 11 | (D) | 4/6 | XV | CV | ◉ | ○ |
| 12 | (C) | 8/2 | XVI / XVII | CV / E | ◉ | ◉ |
| 13 | (D) | 7/3 | XVIII | CV | ◉ | ◉ |
| 14 | (B) | 8/2 | XIX / XX | CV / E | ◉ | ◉ |
| 15 | (B) | 4/6 | XXI | CV | ◉ | ○ |
| 16 | (D) | 8/2 | XXII / XXIII | CV / E | ◉ | ◉ |
| 18 | | 10/0 | Con-1 | CV | △ | ◉ |
|  | | 10/0 | Con-2 | E | | ◉ |
|  | | 10/0 | Con-3 | CV | ○ | ○ |
|  | | 3/7 | Con-4 | CV | ○ | ○ |
|  | | 8/2 | Con-5 | CV | ○ | ◉ |

See footnotes at end of table.

TABLE 1—Continued

| Example | Drying property 5° C. x 20 H | Drying property 20° C. x 12 H | Tack free | Appear-ance of film | Gloss 2 days after | Gloss 15 days after |
|---|---|---|---|---|---|---|
| 1 | ○ | ○ | ○ | ◉ | | |
| 2 | ○ / ○ | ◉ | ◉ | ◉ | 94 | 92 |
| 3 | ○ | ○ | ◉ | ◉ | | |
| 4 | ○ / ○ | ○ | ◉ | ◉ | 92 | 90 |
| 5 | ○ | ○ | ◉ | ◉ | | |
| 7 | ○ | ○ | ◉ | ◉ | | |
| 8 | △~○ | ○ | ◉ | ◉ | | |
| 9 | ○ / ○ | ◉ | ◉ | ◉ | 92 | 90 |
| 11 | ○ | ○ | ◉ | ◉ | | |
| 12 | ○ / ○ | ◉ | ◉ | ◉ | 90 | 87 |
| 13 | △~○ | ○ | ◉ | ◉ | | |
| 14 | △~○ / △~○ | ○ | ◉ | ◉ | 92 | 87 |
| 15 | ○ | ◉ | ○~◉ | ◉ | | |
| 16 | ○ / ○ | ◉ | ○~◉ | ◉ | 91 | 86 |
| 18 | × / × / △ / × / × | △ / △ / ◉ / ○ / ○ | △ / △ / △ / × / △ | × / △ / △ / △ / △ | 70 | 60 |

| Example | Pencil hard-ness | Cross cut ad-hesion | Flexibility 3 mm. φ | Flexibility 6 mm. φ | Du Pont impact Obverse | Du Pont impact Reverse |
|---|---|---|---|---|---|---|
| 1 | B | 100/100 | Pass | Pass | 50 | 50 |
| 2 | 2H / H | 100/100 | do | do | 50 / 50 | 50 / 50 |
| 3 | F | 100/100 | do | do | 50 | 50 |
| 4 | HB / HB | 100/100 | do | do | 50 / 50 | 50 / 50 |
| 5 | B | 100/100 | do | do | 50 | 50 |
| 7 | B | 100/100 | do | do | 50 | 50 |
| 8 | B | 100/100 | do | do | 50 | 50 |
| 9 | 2H / 3H | 100/100 | do | do | 50 / 50 | 50 / 50 |
| 11 | 2H | 100/100 | do | do | 50 | 50 |
| 12 | F / HB | 100/100 | do | do | 50 / 50 | 50 / 50 |
| 13 | B | 100/100 | do | do | 50 | 50 |
| 14 | 2B / B | 100/100 | do | do | 50 / 50 | 50 / 50 |
| 15 | 2H | 100/100 | do | do | 50 | 50 |
| 16 | 2B / B | 100/100 | do | do | 50 / 50 | 50 / 50 |
| 18 | 3B / 2B / 4H / 2H / 2B | 100/100 / 100/100 / 80/100 / 95/100 / 100/100 | do / do / Not pass / do / Pass | do / do / do / do / do | 50 / 50 / 40 / 50 / 50 | 40 / 40 / 30 / 30 / 40 |

NOTE *1.—CV=Clear Varnish; E=Enamel Paint. ◉=Excellent; ○=Good; △=Fair; ×=Poor.

According to the testing results disclosed in Table 1, it would be clear that the air drying varnishes or paints made of the coating materials of the present invention have superior properties to the conventional varnish or paint which was performed only one operation.

EXAMPLE 20

Cleaned steel testing plates were coated with the clear varnishes or enamel paints which were provided in Example 2, 3, 9, 11, 15 and 18 respectively and a thickness of coating film settled in the range from 20 to 30. The coating film were thermally cured at 130° C. for 30 minutes and the cured films was tested. Testing results are presented in Table 2.

TABLE 2

| Example | Polybu-tadiene | Fatty oil/polybu-tadiene | Coating material | Form | Appear-ance of film | Gloss | Alkali resistance |
|---|---|---|---|---|---|---|---|
| 2 | (B) | 3/7 | II / III | CV / E | ◉ / ◉ | 85 | Pass. / Do. |
| 3 | (B) | 4/6 | IV | CV | ◉ | | Do. |
| 9 | (B) | 4/6 | XII / XIII | CV / E | ◉ / ◉ | 86 | |
| 11 | (D) | 4/6 | XV | CV | ◉ | | |
| 15 | (B) | 4/6 | XXI | CV | ◉ / ◉ | | |
| 18 (control) | | 10/0 | Con-3 | CV | ◉ | | Yellowing and swelling. |
| | | 3/7 | Con-4 | CV | △ | | Yellowing. |

TABLE 2—Continued

| Example | Pencil hardness | Sward locker hardness | Cross cut adhesion | Flexibility 3 mm. φ | Flexibility 6 mm. φ | Du Pont impact Obverse | Du Pont impact Reverse |
|---|---|---|---|---|---|---|---|
| 2 | H / H | 15 / 14 | 100/100 | Pass / do | Pass / do | 50 / 50 | 50 / 50 |
| 3 | F | 13 | 100/100 | do | do | 50 | 50 |
| 9 | H / 2H | 15 / 17 | 100/100 | do / do | do / do | 50 / 50 | 50 / 50 |
| 11 | H | 14 | 100/100 | do | do | 50 | 50 |
| 15 | 2H / 3H | 18 / 28 | 100/100 | do / do | do / do | 50 / 50 | 50 / 50 |
| 18 (Control) | 3H / H | 20 / 13 | 70/100 / 80/100 | Not pass / do | do / do | 40 / 40 | 30 / 30 |

According to the testing results presented in Table 2, it would be clear that the thermal curing varnishes and paints made of the coating materials of the present invention have superior and improved properties on flexibility, impact resistance, adhesion and chemical resistance comparing with the conventional varnish which was performed only one operation.

EXAMPLE 21

Cleaned steel testing plates were coated with the water varnishes which were provided in Examples 6, 10 and 17, and mixed with 0.05% of cobalt and manganese in the form of naphthenate mixture. The thickness of every coating film was settled in the range from 20 to 30 by using a barcoater and the coating films were thermally cured at 150° C. for 30 minutes. Cured films were tested and the results are presented in Table 3.

TABLE 3

| Example | Polybutadiene | Fatty oil/ polybutadiene | Coating material | Appearance | Pencil hardness |
|---|---|---|---|---|---|
| 6 | (E) / (E) | 4/6 / 4/6 | VIII / IX | ◎ / ◎ | H / H |
| 10 | (E) | 4/6 | XIV | ◎ | 2H |
| 17 | (F) | 4/6 | XXIV | ◎ | 2H |

| Example | Sward rocker hardness | Cross cut adhesion | Flexibility 3 mm. φ | Flexibility 6 mm. φ | Du Pont impact Obverse | Du Pont impact Reverse |
|---|---|---|---|---|---|---|
| 6 | 15 / 16 | 100/100 | Pass / do | Pass / do | 50 / 50 | 50 / 40 |
| 10 | 18 | 100/100 | do | do | 50 | 50 |
| 17 | 19 | 100/100 | do | do | 50 | 50 |

EXAMPLE 22

The clear varnishes (VV), (IX), (XIV) and (XXIV) were gradually diluted with water until the concentration reached to 10%. Thus, the aqueous solution having the following tabulated properties were obtained.

TABLE 4

| Example | Coating material | Concentration (percent) | pH | Specific resistance (Ω/cm.) | Appearance |
|---|---|---|---|---|---|
| 6 | VIII / IX | 10 / 10 | 7.1 / 7.8 | 1,000 / 500 | Milky white / Do. |
| 10 | XIV | 10 | 7.7 | 600 | Do. |
| 17 | XXIV | 10 | 7.9 | 800 | Do. |

Electro-deposition was carried out at 25–30° C. by applying the above solutions as electrolyte and impressing the tabulated voltage of DC current for 2 minutes between an anode consisting of a mild steel plate treated with zinc phosphate in size of 150 mm. x 0.8 mm., and a cathode in which the said electrolyte was filled, consisting of a cylindrical tin cell in size of a height of 100 mm. and a diameter of 80 mm. After washing the electro-coated anode with water, it was baked for 30 minutes in the oven of 140° C. Thus, a transparent, glassy, cured coating film having a thickness of 20 to 30 was obtained.

The results of testing of the cured film are shown in Table 5.

TABLE 5

| Coating material | VIII | XI | XIV | XXIV |
|---|---|---|---|---|
| Voltage (v.) | 40 | 70 | 40 | 60 |
| Thickness of film (μ) | 25 | 20 | 25 | 26 |
| Resistance of film (KΩ/cm.²) | 140 | 92 | 100 | 105 |
| Coulomb efficiency (mg./coulomb) | 18 | 16 | 17 | 20 |
| Pencil hardness | H | 3H | H | 2H |
| Sward rocker hardness | 16 | 17 | 16 | 18 |
| Cross cut adhesion | 100/100 | 100/100 | 100/100 | 100/100 |
| Flexibility: | | | | |
| 3 mm φ | Pass | 100/100 | 100/100 | 100/100 |
| 6 mm. φ | Pass | 100/100 | 100/100 | 100/100 |
| Du Pont impact: | | | | |
| Obverse | Pass | 100/100 | 100/100 | 100/100 |
| Reverse | Pass | 100/100 | 100/100 | 100/100 |
| Appearance | | ◎ | ◎ | ◎ |

According to the results in the Table 5, it would be clear that the coating materials of this invention give the superior electrodeposited coating films and they are valuable in the commercial standpoint.

We claim:

1. A coating material prepared by a process comprising subjecting an admixture of a fatty oil component and a polybutadiene component to the following operations:
   (a) a boiling operation whereby said mixture is contacted with oxygen at a temperature from about 60° C. to about 150° C. for at least about two hours;
   (b) a bodying operation whereby said mixture is interpolymerized by heating to a temperature from about 100° C. to about 300° C. for at least about one hour in an inert atmosphere; and
   (c) an operation whereby said mixture is reacted with a member selected from the group consisting of mono- and polycarboxylic acids, anhydrides of mono- and polycarboxylic acids at a temperature from about 80° C. to about 250° C. in an inert atmosphere, said oil component being a member selected from the group consisting of a drying oil, a semi-drying oil and mixtures thereof, said polybutadiene component being a member selected from the group consisting of a butadiene homopolymer, a copolymer of butadiene and a member selected from the group consisting of styrene, a methylstyrene and isoprene, said polybutadiene component having an average molecular weight of about 200 to about 10,000 and at least about 80 weight percent of a 1,2-butadiene configuration, and the weight ratio of said polybutadiene component to said fatty oil component being in the range of from about 95:5 to 5:95.

2. A coating material according to claim 1 having an acid value between 30 and 120.

3. A coating material according to claim 1 wherein the ratio of fatty oil component to the polybutadiene component is between about 5 to about 40 parts fatty oil component to between about 95 to about 60 parts polybutadiene component.

4. A coating material according to claim 1 wherein the ratio of fatty oil component to the polybutadiene component is between about 95 to about 60 parts fatty oil component to between about 5 to about 40 parts polybutadiene component.

5. An air drying varnish which comprises the coating material according to claim 1, a solvent and a dryer which is selected from the group consisting of heavy metal salts of organic carboxylic acids.

6. A bake-drying varnish which comprises the coating material according to claim 1, a solvent and a dryer which is selected from the group consisting of heavy metal salts of organic acids and organic peroxide compounds.

7. A paint which comprises a mixture of a pigment, a dryer and the coating material according to claim 1.

8. A varnish which comprises the coating material according to claim 1, a dryer and water, wherein the acid value of the coating material is in the range between 30 and 120.

9. A varnish according to claim 8, wherein the coating materital was neutralized partially or completely by an organic or inorganic base which is selected from the group consisting of alkali metal hydroxides, alkaline earth metal hydroxides, ammonia and amines.

10. A paint which comprises the varnish according to claim 8 and a pigment.

References Cited
UNITED STATES PATENTS

| | | | |
|---|---|---|---|
| 3,442,675 | 5/1969 | Gorkeet et al. | 106—265 X |
| 2,442,086 | 5/1948 | Huff et al. | 260—23.7 |
| 2,653,956 | 9/1953 | Marhofer et al. | 260—407 |
| 2,802,842 | 8/1957 | Nelson et al. | 260—407 |
| 2,846,329 | 8/1958 | Koenecke | 706—265 |
| 3,026,279 | 3/1962 | Mozell et al. | 260—23.7 |
| 3,196,121 | 7/1965 | McKay et al. | 260—23.7 |

JAMES A. SEIDLECK, Primary Examiner

D. J. BARRACK, Assistant Examiner

U.S. Cl. X.R.

106—265, 267; 117—161 UD; 204—182; 260—23.7 N, 29.7 R, 31.2 MR, 33.4 R, 33.6 N, 33.84 R, 41.5 R, 78.4 D